United States Patent [19]

Roerdink et al.

[11] Patent Number: 5,084,552
[45] Date of Patent: Jan. 28, 1992

[54] TERPOLYAMIDE FROM TETRAMETHYLENE DIAMINE

[75] Inventors: Eize Roerdink, Geleen; Jean M. M. Warnier, Stein, both of Netherlands

[73] Assignee: Stamicarbon B.V., Geleen, Netherlands

[21] Appl. No.: 561,465

[22] Filed: Aug. 1, 1990

[30] Foreign Application Priority Data

Aug. 5, 1989 [NL] Netherlands .......................... 8902016

[51] Int. Cl.$^5$ ............................................. C08G 69/26
[52] U.S. Cl. ................................... 528/339; 528/335; 528/347
[58] Field of Search .................... 528/339, 347

[56] References Cited

U.S. PATENT DOCUMENTS 4,849,498 7/1989 Roerdink et al. .................. 528/339
4,868,280 9/1989 Gaymans ............................ 528/339

OTHER PUBLICATIONS (1) Table 3-CEP (Jan. 19895), p. 50.
(2) Industrielle Herstellung Und Eigenschaften Der Kunststoff pp. 1207-09, (1963). Translation Sheet (5).

*Primary Examiner*—Harold D. Anderson
*Attorney, Agent, or Firm*—Cushman, Darby & Cushman

[57] ABSTRACT

The invention relates to a polyamide composition comprising tetramethylene adipamide, tetramethyleneterephthalamide and tetramethylene isophthalamide units. the polyamide composition has a melting temperature in the same order as the homopolymer tetramethylene adipamide, a comparable crystallinity but very improved melt stability and stiffness.

7 Claims, 2 Drawing Sheets

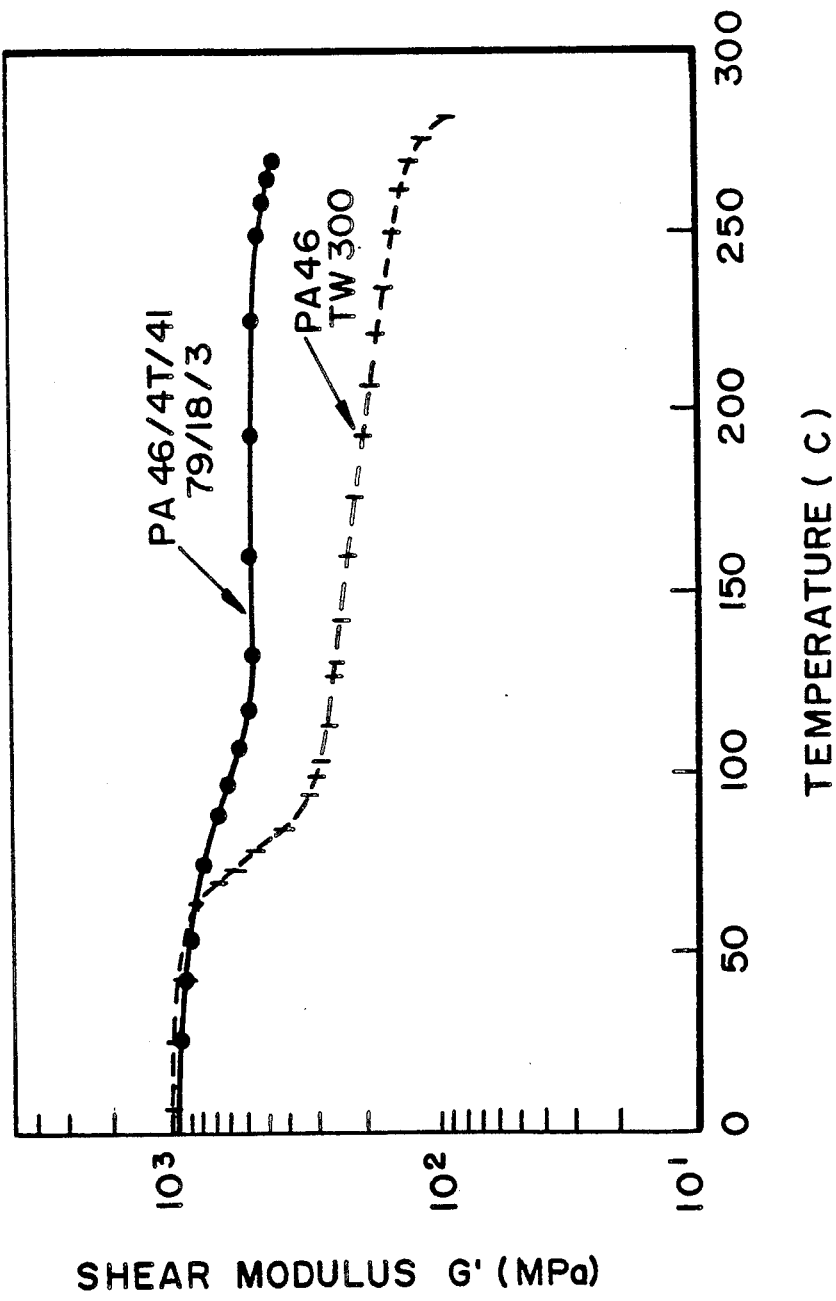

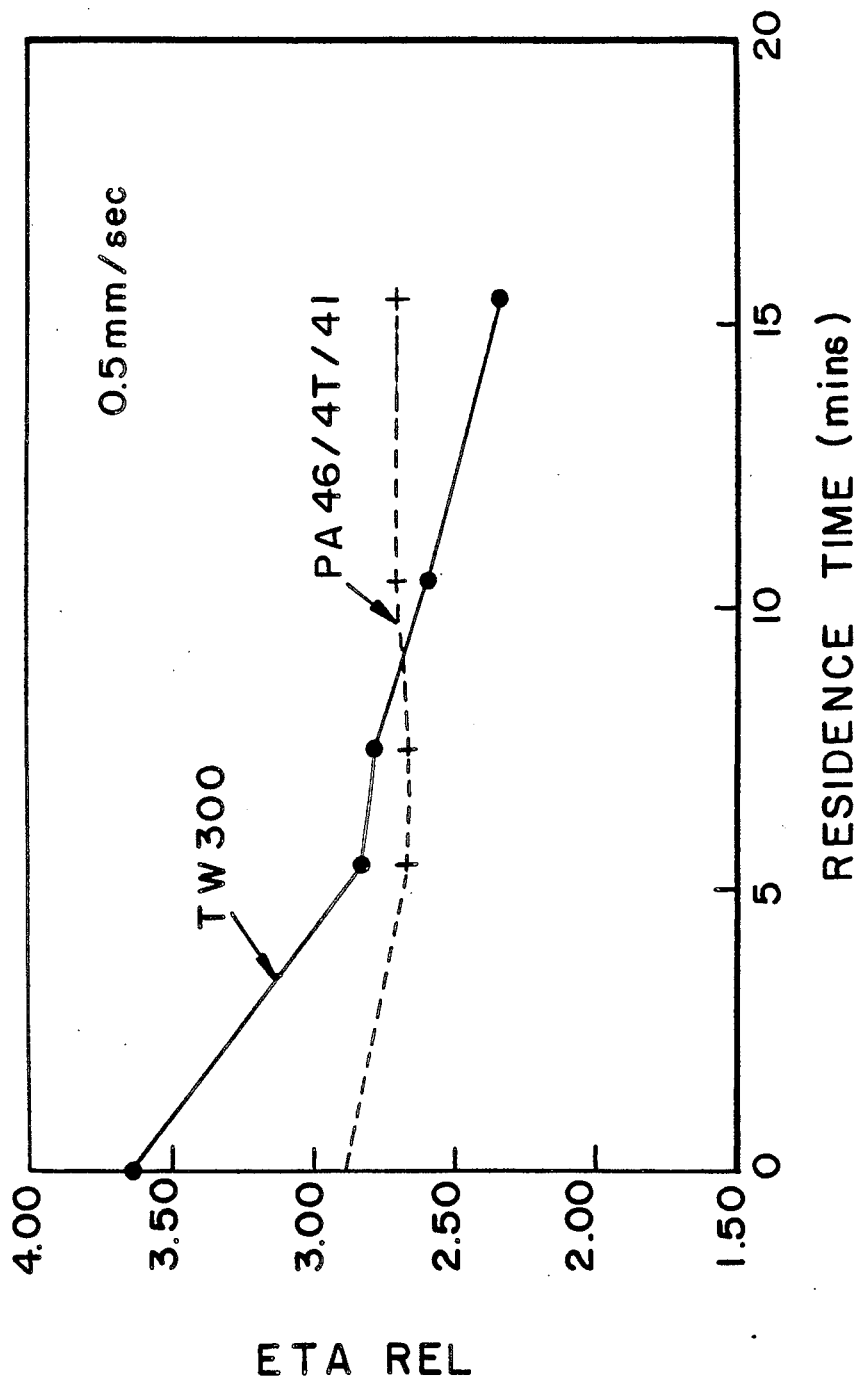

TERPOLYAMIDE FROM TETRAMETHYLENE DIAMINE

The invention relates to a polyamide composition substantially consisting of tetramethyleneadipamide units with improved melt stability. One technical problem concerned with the processing of tetramethyleneadiapmide, nylon 4.6 is its high melting temperature. Due to this high temperature decomposition of the polymer may occur and the molecular weight will decrease. Especially in situations in which the residence time in the melt is long, for instance in case of machine failure during injection molding, or when high requirements are set for a stable melt viscosity, for instance during melt spinning, this may lead to unwanted results and loss of material. The decomposition rate is temperature dependant and lowering of the melting temperature of the nylon 4.6 by copolymerising for instance units of lower melting polyamides into it might solve the problem. However lowering of the melting temperature of the polyamide in this manner will have a very negative effect on the excellent mechanical properties of nylon 4.6 at high temperature.

It is therefore the object of the present invention to improve the melt stability of nylon 4.6, without deteriorating its mechanical properties at high temperature. It has been found now that in a polyamide composition which comprises substantially tetramethylene adipamide the simultaneous incorporation of tetramethylene terephthalic amide and tetramethylene isophthalamide units gives an appreciable improvement of the melt stability, with almost full retainment of the excellent mechanical properties of the homopolymer.

The polyamide composition according to the invention comprises:

a. tetramethylene adipamide units (4.6)
b. tetramethylene terephthalamide units (4.T)
c. tetramethylene isophthalamide units (4.I)

where the a:b:c ratio ranges between 0.95–0.50:0.04–0.45:0.01–0.25 and $a+b+c=1$. Preferably the ratio is between 0.90–0.55:0.08–0.40:0.02–0.20. Even more preferably the ratio is between 0.90–0.70:0.08–0.30:0.02–0.15. Preferably b exceeds c, for instance $b \geq 1.5\ c$, more preferably $b \geq 2c$.

The composition can be a mixture of the homopolymers, of one or more homopolymers and one or more copolymers or the terpolymer of 4.6, 4.T and 4.I or mixtures thereof. However preference is given to the terpolymer due to its higher homogeneity. The copolymers 4.6/4.I and 4.6/4.T are known from U.S. Pat. Nos. 4,849,498 and 4,868,280 respectively.

Over virtually the full range of the compositions the terpolymer according to the invention shows a melting point that does not exceed that of the homopolymer by more than 5° C. As a result, the processability is excellent.

In spite of the relatively high copolymer content, the rigidity of the terpolyamide continues to be of the same level as that of the homopolyamide 4.6, or very surprisingly is even superior over that of the homopolyamide.

The terpolyamide according to the invention may contain the usual additives, for instance colourants, pigments, stabilizers, impact modifiers, reinforcing fillers, release agents, flame retardants and other polymers.

The terpolyamide according to the invention can be used for the moulding of products from the melt by means of, inter alia, injection moulding, extrusion, extrusion blow moulding and compression moulding.

Products obtained by using terpolymers according to the invention may be, for instance, car parts, electrical and electronic parts, films and fibres.

The terpolyamides can be prepared in various ways known per se for the preparation of polyamide and copolymers thereof. Examples thereof are described in, for instance, U.S. Pat. No. 4,868,280. Preference is given to using the process in which, proceeding from a mixture of the salts of tetramethylenediamine and adipic acid, terephthalic acid and isophthalic acid respectively, to which water and an excess of tetramethylenediamine have been added, polycondensation is carried out via the melt and subsequently after-condensation in the solid phase in a steam-containing inert gas. Another preferred process is that the mixture of adipic acid, the salt of tetramethylenediamine and adipic acid and (di(4-aminobutyl)terephthalamide and the di(4-aminobutyl)isophthalamide)

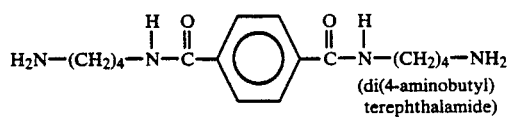
(di(4-aminobutyl) terephthalamide)

and

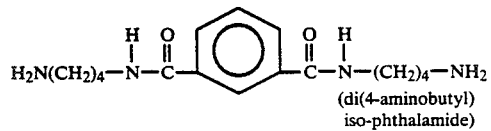
(di(4-aminobutyl) iso-phthalamide)

is started from.

The invention will now be further elucidated by means of the following examples and comparative examples without, however, being limited thereto.

If not indicated otherwise, the following methods have been used to define the properties of the terpolyamides in the examples.

Differential temperature analysis for determining the melting heat and melting temperature. Heating rate 5° C./minute, cooling rate 5° C./minute. The values for the melting temperature Tm and the melting heat ΔHm, obtained from the 2nd scan, are mentioned. The measurements have been made using a DSC2 Thermal Analyser of Perkin-Elmer. The crystallization temperature Tc is obtained from the peak during cooling.

The relative viscosity was determined on a solution of 1 gramme polymer in 100 ml 96% (wt) sulphuric acid at 25° C.

EXAMPLE 1

4.6/4.T/4.I (0.79/0.18/0.03 mole/mole)

In a 2.5-liter stainless steel double-walled reactor (Jücheim) provided with anchor agitator, thermometer holder and distillation arrangement were introduced: 348.8 grammes (3.96 moles) 1.4-diaminobutane in the form of an 80% (wt) solution in water; 457.8 grammes (3.14 moles) adipic acid; 118.2 grammes (0.71 mole) terephthalic acid; 18.3 grammes (0.11 mole) isophthalic acid.

To compensate for amine losses, an additional amount of 23.7 grammes (0.27 mole) diaminobutane was added (in the form of an aqueous solution).

The total amount of water was made up to 721 grammes.

The mixture was heated to 170° C. under an excess pressure of 1 bar while water was being distilled off; the amount of water distilled off was 617 grammes.

The reactor was closed and further heated to 210° C. and kept at this temperature for about 45 minutes. The pressure built up in the process was 16 bar.

The reactor contents were flashed and the formed powder was subjected to after-condensation in a tumble dryer for 24 hours at 255° C. while passing over 80 l (ntp) $N_2$ and 30 grammes steam per hour.

A DSC analysis using a heating rate of 5° C. per minute and a residence time at 310° C. of 2 minutes resulted in Tc, 265° C.
Tm, 291.4° C.
melting enthalpy, 78.2 J/g.

Under the same DSC conditions polyamide 4.6 homopolymer (STANYL TW 300 of the firm of DSM, the Netherlands) gives:

Tc, 265° C.
Tm, 290° C.
melting enthalpy, 80 J/g.

This example shows that the terpolymer with a total aromatic polyamide content of 21% has virtually the same melting point and crystallinity as the polyamide 4,6.

Of the terpolyeer obtained in this experiment test bars have been produced by injection molding on an Arburg 5 injection moulding machine with a melt temperature of 310° C. and mold temperature of 120° C. Of these test bars the following properties have been determined (Table 1)

TABLE 1

|  | 4.6 | 4.6/4.T/4.I |
|---|---|---|
| Tensile strength at yield [N/mm$^2$]*) | 102.4 ± 0.7 | 103 ± 5 |
| Tensile strength at break [N/mm$^2$]*) | 84 ± 12 | 103 ± 7 |
| Elongation at break [%]*) | 33 ± 10 | 6 ± 5 |
| Tensile modulus [N/mm$^2$]*) | 3090 ± 46 | 3190 ± 70 |

*)Determined according to ASTM D 638

For comparison the data for the homopolymer nylon 4.6, STANYL TW 300, a commercial nylon 4.6 grade, copper stabilised, with $\eta_{rel}=3.26$ from DSM, the Netherlands, are shown.

In a torsion damping measurement the shear modulus of the terpolymer and the homopolymer have been compared at different temperatures. The results are shown in Table 2 and FIG. 1.

TABLE 2

| Temperature [°C.] | Shear Modulus 4.6/4.T/4.I G'[Pa · 10$^8$] | 4.6 |
|---|---|---|
| 0 | 11 | 11 |
| 50 | 10.7 | 10.8 |
| 100 | 8.0 | 3.0 |
| 140 | 5.9 | 2.2 |
| 180 | 5.7 | 2.0 |
| 250 | 5.2 | 1.3 |

Above the glass temperature (100° C.) of the terpolymer its stiffness is nearly three times higher than that of the homopolymer.

This result is very unexpected in view of U.S. Pat. No. 4,868,280 in which G' for 4.6/4.T and the homopolymer did not differ this significantly, and the melting point lowering effect of the introduction of the 4.I groups.

The melt stability at different temperatures of the terpolymer was compared with the melt stability of the homopolymer in the following experiment.

Approximately 25 grammes of pre-dried granulate (16 Hrs.@105° C.) is introduced into the heating barrel of the Rheograph 2000 Rheometer. The granulate is heated to the test temperature over a 5 minute period. The molten material is extruded through a capillary die (Length 30 mm, Diameter=1 mm) at a shear rate of 5 mm/second. Samples of the extruded string are collected in water at regular time intervals. Each of the samples collected undergoes a relative viscosity measurement using an Ubbelohde Viscometer. A plot of the change in relative viscosity as a function of residence time is given in FIG. 2. From this figure it is clear that the composition according to the invention has superior melt stability over the homopolymer.

EXAMPLE 2

4.6/4.T/4.I (0.79/0.16/0.05 mole/mole)

In the 2.5-liter reactor were introduced 248.8 grammes (3.96 moles) 1.4-diaminobutane as 80% solution in water; 455.6 grammes (3.12 moles) adipic acid; 109.8 grammes (0.66 mole) terephthalic acid; 29.6 grammes (0.18 mole) isophthalic acid.

To compensate for amine losses, an additional amount of 28.2 grammes (0.32 mole) diaminobutane was added in the form of an aqueous solution.

The amount of water was made up to 725 grammes.

The polymerization was carried out in conformity with example 1. The relative viscosity of the polyamide obtained was 2.65.

Tc=258° C.
Tm=287° C.
ΔHm=94.5 J/g

This example shows that a melting point below that of polyamide 4,6 is possible without a decline of the crystallinity and, with it, the rigidity.

The terpolymer was used in a spinning experiment in a Fourné Laboratory spinning equipment. The spinning conditions were:

Extruder: set temperatures in the zones: 220° C., 315° C., 315° C. and 287° C. respectively.
Temperature of the spinhead: 315° C.
Temperature of the heated hood: 300° C.
Pressure: 80 bar.
Spinhead: 10 openings of 0.25 mm diameter
Production 15 g/min.
Spinfinish: 15% volume Estesol NCW, a product of Stockhausen (FRG) and 3 g/l Dekal BX, a product of BASF, Ned. B.V. in water.
Take-up speed: 450 m/min.
Draw-down: 14.5.

In a comparative experiment polyamide 4.6 with $\eta_{rel}$ =3.50 was spun under identical conditions.

Consequently the filaments were drawn with the following ratios and at the following temperatures:

| ratio | temperature galet/plate |
|---|---|
| 1.03 | |
| 3.5 | 100° C./200° C. |
| 1.39 | 240° C./240° C. | and last godet at room temperature, total draw ratio 5.0. speed 150 m/min.

The modulus of the filament yarn obtained from the terpolymer was nearly 50% higher than that of the homopolymer (48.6 vs. 33.1 cN.dtex). This property makes it very suitable as reinforcement in rubber; for instance in tires. It is further surprising that even with this low relative viscosity the terpolymer can easily been spun and drawn.

EXAMPLE 3

4.6/4.T/4.I (0.78/0.18/0.04 mole/mole)

In a 2.5-liter stainless steel double-walled reactor (Jücheim) provided with anchor agitator, thermometer holder and distillation arrangement were introduced: 217.9 grammes (2.47 moles) 1.4-diaminobutane in the form of an 80% (wt) solution in water; 283.5 grammes (1.94 moles) adipic acid; 73.1 grammes (0.44 mole) terephthalic acid; 15.2 grammes (0.09 mole) isophthalic acid.

To compensate for amine losses, an additional amount of 5.9 grammes (0.067 mole) diaminobutane was added (in the form of an aqueous solution).

The total amount of water was made up to 400 grammes.

The mixture was heated to 170° C. under an excess pressure of 1 bar while water was being distilled off; the amount of water distilled off was 335 grammes.

The reactor was closed and further heated to 210° C. and kept at this temperature for about 30 minutes. The pressure built up in the process was 13 bar.

The reactor contents were flashed and the formed powder was subjected to after-condensation in a tumble dryer for 24 hours at 255° C. while passing over 80 l (ntp) N2 and 30 grammes steam per hour.

A DSC analysis using a heating rate of 5° C. per minute and a residence time at 310° C. of 2 minutes resulted in Tc, 258° C.
Tm, 287.6° C.
melting enthalpy, 78.2 J/g.

This example shows that the terpolymer with a total aromatic polyamide content of 22% has virtually the same melting point and crystallinity as the polyamide 4,6.

EXAMPLE 4

4.6/4.T/4.I (0.74/0.17/0.09 mole/mole)

(In the 2.5-liter reactor were introduced: 217.9 grammes (2.47 moles) 1.4-diaminobutane as 80% solution in water; 265.5 grammes (1.82 moles) adipic acid; 68.5 grammes (0.41 mole) terephthalic acid; 38.0 grammes (0.23 mole) isophthalic acid.

To compensate for amine losses, an additional amount of 29.5 grammes (0.33 mole) diaminobutane was added in the form of an aqueous solution.

The amount of water was made up to 400 grammes.

The polymerization was carried out in conformity with example 1; except for the solid phase after-condensation, which was carried out for 5 hours at 240° C.

The relative viscosity of the polyamide obtained was 2.23.

Tc=252° C.
Tm=281° C.
ΔHm=53 J/g

This example shows that a melting point below that of polyamide 4.6 is possible without too strong a decline of the crystallinity and, with it, the rigidity.

COMPARATIVE EXAMPLE 1

4.6/4.T (0,81/0,19 mole/mole)

In the 2.5-liter reactor were introduced: 217.9 grammes (2.47 moles) 1,4-diaminobutane as 80% solution 294.95 grammes (2.02 moles) adipic acid 76.15 grammes (0.46 mole) terephthalic acid.

To compensate for amine losses, an additional amount of 5.9 grammes (0.067 mole) diaminobutane was presented (in the form of an aqueous solution).

The total amount of water was made up to 400 grammes.

Polymerization took place as in example 2.

The $\eta_{rel}$ of the polyamide obtained was 2.26.

Tc=278° C.
Tm=296° C.
Hm=71.5 J/g.

Although the crystallinity is reasonably well preserved, as expected, the melting temperature has increased considerably, which makes its processing more sensitive.

COMPARATIVE EXAMPLE 2

4.6/4.T (0.72/0.28 mole/mole)

In the 2.5-liter reactor were introduced: 214 grammes 1.4-diaminobutane (=2.43 moles) (as 80% solution in water) 256.9 grammes adipic acid (=1.77 moles) 112.2 grammes terephthalic acid (=0.68 mole) Extra 1.4-diaminobutane: 5.9 grammes (=0.067 mole).

Water was made up to 400 grammes in all.

The polymerization was carried out as in example 1, but the solid phase after-condensation took place at 240° C. instead of 255° C.

Polymer $\eta_{rel}$=1.87
Tc=289° C.
Tm (2nd scan)=303° C.
ΔHm (2nd scan)=27.5 J/g.

Owing to the high melting temperature, the copolymer of this comparative example can only be processed with utmost care. (Owing to the relatively low molecular weight, the value for the melting heat is not representative).

We claim:

1. Polyamide composition comprising
   a. tetramethylene adipamide units
   b. tetramethylene terephthalamide units
   c. tetramethylene isophthalamide units where the a:b:c ration =0.95–0.50:0.04–0.45:0.01–0.25 and a+b+c=1 wherein said composition has an improved melt stability.

2. Polyamide composition according to claim 1, wherein a:b:c=0.90–0.55:0.40:0.02–0.20.

3. Polyamide composition according to claim 1 characterized in that b>c.

4. Polyamide composition according to claim 3, characterized in that b>1.5 c.

5. Moulded article of the polyamide composition according to claim 1.

6. Film of the polyamide composition according to claim 1.

7. Fibre of the polyamide composition according to claim 1.

* * * * *